3,117,100
POLYETHYLENE ADHESIVES
Robert P. Cox, Madison, John L. Wagner, Verona, and Robert J. Sexe, Madison, Wis., assignors to E. I. du Pont de Nemours and Company, Wilmington, Del., a corporation of Delaware
No Drawing. Filed July 31, 1957, Ser. No. 675,274
2 Claims. (Cl. 260—23.7)

This invention relates to adhesives for synthetic organic resinous materials and, in particular to thermosetting adhesives for polyethylene.

Heretofore joints between articles of polyethylene such as polyethylene films have been made by heat sealing or by utilizing pressure sensitive adhesives.

No satisfactory adhesive has been heretofore known which could be utilized to provide a bond to polyethylene articles, such as molded bodies or film bodies, which would be non-pressure sensitive, and therefore relatively devoid of tendency to exhibit creep or cold-flow failure, and which would be relatively permanent in nature and which would make it possible to readily provide adhesive joints having a strength equal to that of the joined material, even when subjected to high loads for long periods.

The present invention relates to an adhesive for polyethylene which does not modify the polyethylene by heat distortion, is easy to apply, and which provides a thermosetting adhesive bond far superior to those heretofore obtainable.

It is therefore an object of the present invention to provide a polyethylene adhesive which provides bonds having high tensile and shear strength in a relatively short time after application.

Another object is an adhesive which provides bonds to polyethylene which exhibit high shear strength under slow or static weight loading of the bond.

Another object is a polyethylene adhesive which may be made and applied with a minimum of expense and effort.

Another object is a method for bonding polyethylene to itself or other materials without the use of specialized heat sealing equipment.

Further objects will become apparent from the following detailed description in which it is our intention to illustrate the applicability of the invention without thereby limiting its scope to less than that of all those equivalents which will be apparent to one skilled in the art.

In accordance with the present invention we prepare an adhesive composition containing the following ingredients: a drying oil such as tung oil, a tackifying agent such as a chlorinated hydrocarbon, and/or a chlorinated rosin ester, a hydrocarbon-soluble monomer capable of copolymerization with the drying oil; such substances as styrene, α-methyl styrene and methacrylic acid have been found to yield good results, and a catalytic material; preferable catalytic materials generally contain two or more substances having a catalytic effect and may be referred to as catalyst systems.

In the preparation of adhesives for polyethylene as herein contemplated, the tung oil may be replaced by other unsaturated natural drying oils with iodine value above 100, unsaturated synthetic drying oils wherein the polyhydric alcohol groups have been substituted by another polyhydric alcohol having more than two hydroxyl groups, and the unsaturated fatty acids. Thus we may use as unsaturated natural oils, cashew nut shell oil, cod liver oil, linseed oil, menhaden oil, oiticica oil, herring oil, mustard seed oil, peanut oil, perilla oil, poppy seed oil, porpoise oil, rape seed oil, sardine oil, seal oil, sesame oil, shark liver oil, soybean oil, sunflower seed oil, tall oil, whale oil and walnut oil. Unsaturated drying oils with iodine values below 100 such as cashew nut oil, coconut oil, cohune kernel oil, horse fat, lard oil, neats foot oil, olive oil, palm oil, palm nut oil, sperm oil, spermaceti oil and tallow oil are not as satisfactory as those with higher iodine values, i.e., iodine values above 100. We may use as unsaturated synthetic drying oils, polybutadiene base oils, styrenated vegetable oils, and vinyltoluene vegetable oil copolymers, unsaturated polyesters of glycol and unsaturated dibasic acids, epoxy resin esters of unsaturated drying oils, and unsaturated alkyd resins. Unsaturated fatty acids that may be used include: decylenic, stillingic (cis, trans), dodecylenic, palmitoleic (cis), oleic (cis), ricinoleic (cis), petroselinic (cis), vaccenic (cis, trans), linoleic, linolenic, eleostearic (cis, trans, trans), licanic, parinaric, gadoleic, arachidonic, cetoleic, erucic (cis), and selacholeic (cis) acid.

The percentage of drying oil in the adhesive may be from 5 to 95 percent and preferred results are obtained when the drying oil of the adhesive is varied from 40 to 70%, however, optimum results are obtained when the drying oil is about 50% of the mixture.

The tackifying agents used in the preparation of the adhesive may include one or more of the group consisting of chlorinated hydrocarbons, and chlorinated rosin ester compounds. Chlorinated hydrocarbons which may be used as tackifying agents include chlorinated paraffins, chlorinated rubbers, polymers and copolymers of 2-chlorobutadiene-1,3, tetrachloroethylene, and chlorinated naphthalene, mixtures of chlorinated polyphenyls including chlorinated biphenyls, compounds of the chlorinated rosin esters which may be useful in the preparation of this adhesive may include pentaerythritol-, polyglycerol-, glyceryl-, mannitol-, erythritol-, sorbitol-, ethylene glycol-, and propylene glycol- esters of natural and hydrogenated rosins.

The percentage of tackifying agent in the adhesive may be from 2 to 65%; preferred results are generally obtained when the concentration is from 10 to 20%, however, optimum results are obtained when the tackifying agent is about 20% of the mixture.

The hydrocarbon soluble monomers used in the preparation of the adhesive may include one or more of the following: isoprene, dipentene, camphane, p-cymene, p-methane, ocimene, myrcene, α-terpinene, carene, sabinene, α-pinene, B-pinene, vinyl methoxy acetate, vinyl diethyl acetate, vinyl trimethyl acetate, vinyl propionate, vinyl isobutyrate, vinyl butyrate, isopropenyl butyrate, vinyl methacrylate, vinyl crotonate, vinyl valerate, vinyl caproate, vinyl caprylate, vinyl α-ethylcaproate, vinyl pelargonate, vinyl laurate, vinyl myristate, vinyl palmitate, vinyl oleate, vinyl stearate, vinyl linoleate, dimethylbutadiene, dimethylcumarone, dipentene, butadiene, methylbutadiene, dimethylbutadiene, isobutene, pentadiene, dicyclopentadiene, cyclopentadiene, propylene trimer, α-methyl styrene, styrene, 2-chlorostyrene, dichlorostyrene, methyl pentadiene, methacrylic anhydride, vinyl benzoate and 2-chloroethoxy ethyl acrylate, however, other hydrocarbon soluble monomers are operable.

The percentage of hydrocarbon soluble monomer in the adhesive may be from 1 to 50% and preferred results are obtained when the concentration is from 10 to 35%, however, optimum results are obtained when the hydrocarbon soluble monomer is about 25% of the mixture.

The percentage of catalytic material in the adhesive may be varied from .5 to 7% and preferred results are obtained when the concentration is from 2 to 6%.

While we do not wish to commit ourselves to any particular theory regarding the cause of the remarkable adhesive effect obtained, it is our belief that the unsaturated drying oil chains penetrate into the polyethylene structures where they are cross-linked in situ. We believe this to be at least partially substantiated by the fact that partially polymerized blown tung oil is not as satisfactory as is relatively unpolymerized tung oil in its natural state.

The following examples are provided to illustrate the invention. In the examples and in the appended claims all parts are by weight unless otherwise indicated.

*Example 1*

| | Parts by weight |
|---|---|
| Tung oil (raw domestic) | 69.3 |
| α-Methylstyrene | 3.85 |
| Benzoyl peroxide | 3.47 |
| Cobalt naphthenate dried (6% cobalt) | .38 |
| Aroclor 4465 (a mixture of chlorinated biphenyls and polyphenyl produced by the Monsanto Chemical Company) | 23.00 |

The resulting mixture was applied to ½" x ⅛" x 3" polyethylene strips and cured for 24 hours at 80° C. The resultant shear tensile strength of the bond was about 600 p.s.i.

*Example 2*

The following materials were mixed together:

| | Parts by weight |
|---|---|
| Tung oil (raw domestic) | 50 |
| α-Methylstyrene | 25 |
| Parlon (a chlorinated rubber produced by Hercules Powder Company) | 20 |
| Benzoyl peroxide | 4.5 |
| Cobalt naphthenate dried (6% cobalt) | .5 |

The resultant mixture was applied to ½" x ⅛" x 3" polyethylene strips and cured 48 hours at 80° C. The resultant shear tensile strength of the bond was about 1240 p.s.i.

*Example 3*

The following materials were mixed together:

| | Parts by weight |
|---|---|
| Tung oil (raw domesic) | 50 |
| α-Methylstyrene | 25 |
| Parlon (125 cps.) (a chlorinated rubber produced by Hercules Powder Company) | 20 |
| Sulfuryl chloride ($SO_2Cl_2$) | 1½ |
| Iron naphthenate drier (6% Fe) | 1½ |

The resultant mixture was applied to ½" x ⅛" x 3" polyethylene strips and cured 48 hours at 20° C. The resultant shear tensile strength of the bond was about 750 p.s.i.

*Example 4*

The following materials were mixed together:

| | Parts by weight |
|---|---|
| Tung oil (raw domestic) | 45 |
| Methacrylic acid | 30 |
| Chlorowax 70 (a chlorinated paraffin produced by Diamond Alkali Company) | 20 |
| Methyl ethyl ketone peroxide | 4½ |
| Cobalt naphthenate dried (6% Co) | ½ |

The resultant mixture was applied to ½" x ⅛" x 3" polyethylene strips and cured for 24 hours at 80° C. The resultant shear tensile strength of the bond was about 900 p.s.i.

*Example 5*

The following materials were mixed together:

| | Parts by weight |
|---|---|
| Styrenated linseed oil | 50 |
| Styrene | 20 |
| Aroclor 4465 (a mixture of chlorinated biphenyls and polyphenyl produced by the Monsanto Chemical Company) | 25 |
| Benzoyl peroxide | 4½ |
| Iron naphthenate dried (6% Fe) | ½ |

The resultant mixture was applied to ½" x ⅛" x 3" polyethylene strips and cured 48 hours at 70° C. The resultant shear tensile strength of the bond was about 900 p.s.i.

*Example 6*

The following materials were mixed together:

| | Parts by weight |
|---|---|
| Tung oil (raw domestic) | 25 |
| Tall oil | 25 |
| Methyl styrene | 25 |
| Chlorowax 100S (a chlorinated paraffin produced by Diamond Alakli Company) | 20 |
| Cobalt naphthenate dried (6% Co) | ½ |
| Cumene hydroperoxide | 4½ |

The resultant mixture was applied to ½" x ⅛" x 3" polyethylene strips and cured for 48 hours at 65° C. The resultant shear tensile strength of the bond was about 800 ps.i.

*Example 7*

The following materials were mixed together:

| | Parts by weight |
|---|---|
| Tung oil (raw imported from Argentina) | 25 |
| Styrenated linseed oil | 25 |
| Parlon—250 cps. (a chlorinated rubber produced by Hercules Powder Company) | 20 |
| Methyl ethyl ketone peroxide | 4½ |
| Manganese naphthenate dried (6% manganese) | ½ |

The resultant mixture was applied to ½" x ⅛" x 3" polyethylene strips and cured for 48 hours at 70° C. The resultant shear tensile strength by the bond was about 850 ps.i.

*Example 8*

The following materials were mixed together:

| | Parts by weight |
|---|---|
| Tung oil (raw domestic) | 50 |
| Pentalyn B25 (a pentaerythritol ester of rosin produced by the Hercules Powder Company) | 30 |
| α-Methyl styrene | 15 |
| Benzoyl peroxide | 4½ |
| Iron naphthenate dried (6% Fe) | ½ |

The resultant mixture was applied to ½" x ⅛" x 3" polyethylene strips and cured for 48 hours at 80 °C. The resultant shear tensile strength by the bond was about 850 ps.i.

*Example 9*

The following materials are mixed together:

| | Parts by weight |
|---|---|
| Tung oil (raw domestic) | 95 |
| α-Methyl styrene | 2 |
| Benzoyl peroxide | 1 |
| Aroclor 4465 (a mixture of chlorinated biphenyls and polyphenyls produced by Monsanto Chemical Co.) | 1½ |
| Cobalt naphthenate dried (6% Co) | ½ |

*Example 10*

The following materials are mixed together:

| | Parts by weight |
|---|---|
| Linoleic acid | 40 |
| α-Methyl styrene | 30 |
| Parlon (a chlorinated rubber produced by Hercules Powder Company) | 25 |
| Benzoyl peroxide | 4½ |
| Cobalt naphthenate drier (6% Co) | ½ |

The resultant mixture is applied to ½" x ⅛" x 3" polyethylene strips and cured 48 hours at 80° C. The resultant shear tensile strength by the bond is about 600 p.s.i.

Example 11

The following materials are mixed together:

| | Parts by weight |
|---|---|
| Linolenic acid | 40 |
| α-Methyl styrene | 30 |
| Parlon (a chlorinated rubber produced by Hercules Powder Company) | 25 |
| Benzoyl peroxide | 4½ |
| Cobalt naphthenate drier (6% Co) | ½ |

The resultant mixture is applied to ½" x ⅛" x 3" polyethylene strips and cured 48 hours at 80° C. The resultant shear tensile strength by the bond is about 700 p.s.i.

Example 12

The following materials are mixed together:

| | Parts by weight |
|---|---|
| Butarez (a polybutadiene base oil produced by Phillips Petroleum Company) | 40 |
| α-Methyl styrene | 30 |
| Parlon (a chlorinated rubber produced by Hercules Powder Company) | 25 |
| Benzoyl peroxide | 4½ |
| Cobalt naphthenate drier (6% Co) | ½ |

The resultant mixture was applied to ½" x ⅛" x 3" polyethylene strips and cured for 48 hours at 80° C. The resultant shear tensile strength of the bond is about 550 p.s.i.

Example 13

The following materials are mixed together:

| | Parts by weight |
|---|---|
| Styrenated linseed oil | 50 |
| Styrene | 20 |
| Aroclor 4465 (a mixture of chlorinated biphenyls and polyphenyl produced by Monsanto Chemical Company) | 25 |

Within 24 hours of application 4½ parts by weight of benzoyl peroxide and ½ part by weight of iron naphthenate are added, to the aforementioned mixture. The resultant mixture is mixed well and applied to a polyethylene body, placing another body in contact therewith, and subsequently heated to 70° C. for 48 hours to provide a bond to said polyethylene body having a shear strength greater than 800 pounds p.s.i.

Example 14

The following materials are mixed together:

| | Parts by weight |
|---|---|
| Tung oil (raw domestic) | 50 |
| α-Methyl styrene | 25 |
| Parlon (a chlorinated rubber produced by Hercules Powder Company) | 20 |

Within 24 hours of application 4½ parts by weight of benzoyl peroxide and ½ part by weight of cobalt naphthenate are added to the aforementioned mixture. The resultant mixture is mixed well and applied to a polyethylene body, placing another body in contact therewith, and subsequently heated to 80° C. for 48 hours to provide a bond to said polyethylene body having a shear strength greater than 1000 pounds p.s.i.

Example 15

The composition of Example 1 is applied to a ½" x ⅛" x 3" polyethylene strip and to a ½" x ⅛" x 3" Mylar strip (Mylar, a polyester film produced by du Pont) and after joining the two strips, the resultant body is cured for 24 hours at 80° C. The resultant shear tensile strength of the bond is about 500 p.s.i.

Other materials to which polyethylene may be suitably bonded include: plasticized or unplasticized films of polyvinyl chloride or polyvinyl acetate or polyvinylidene chloride or copolymers of two or more of these, polytetrafluoroethylene, polychlorotrifluoroethylene, polyamides, polyvinyl alcohol, regenerated cellulose, cellulose esters such as cellulose acetate, cellulose ethers such as ethyl cellulose, polyesters such as Mylar (produced by the du Pont Company), and polystyrene. The adhesive may also suitably be used to bond polyethylenes to materials such as paper, glass, leather, metal, ceramics, fabrics, netting, wood, plastic, concrete, cork, stone, painted surfaces, rubber, etc.

In accordance with the present invention, the adhesive composition is prepared by mixing a drying oil, a tackifying agent and a hydrocarbon soluble monomer capable of copolymerization with the drying oil with a catalytic material and within 24 hours thereafter applying the resultant mixture to a polyethylene body, placing another body in contact therewith, and subsequently heating it from 75° to 85° C. for from 24 to 48 hours to provide a bond to said polyethylene body having a shear strength greater than 500 p.s.i.

It is to be understood that the proportion of the components in the adhesive may be changed, within the wide range of variation described in the specification, without departing from the scope of the invention and it is intended to include all such proportions as come within the scope of the appended claims.

The composition of our invention may also be used as a paint or coating material for polyethylene. It may be used to provide a colored coating on a sheet of polyethylene or other polyethylene article by first incorporating from ½% to 10% of coloring matter in the composition. Thus, as a specific example, 2% of carbon black is added to the composition of Example 1 and milled thoroughly therewith; the resultant composition is applied with a brush to a polyethylene article to provide a protective coating thereon.

The composition may be utilized to provide a clear uncolored coating, if desired, by coating it on a polyethylene article without prior admixture with coloring matter.

Having thus disclosed our invention, we claim:

1. An adhesive composition capable of bonding polyethylene surfaces when placed in contact therewith and heating the resultant body at 75° to 85° C. for 24 to 48 hours, thus producing a bond having a shear strength greater than 500 p.s.i., said composition comprising a mixture of (1) 40 to 70% of an oil selected from the group consisting of unsaturated natural drying oils having an iodine value above 100, linoleic acid, and unsaturated synthetic drying oils wherein the polyhydric alcohol component of an unsaturated natural drying oil having an iodine value above 100 is replaced by a different polyhydric alcohol having more than two carbons, said different polyhydric alcohol component being combined with the fatty acid component of said unsaturated natural drying oil, (2) 2 to 65% tackifying agent selected from the group consisting of chlorinated paraffins, chlorinated rubbers, polymers of 2-chlorobutadiene-1,3, and mixtures of chlorinated polyphenyls, (3) 1 to 50% of hydrocarbon soluble monomer capable of copolymerization with said drying oil, said monomer being selected from the class consisting of styrene, methyl styrene, and methacrylic acid, and (4) 0.5 to 7% of catalytic material comprising a member of the class consisting of cobalt naphthenate, iron naphthenate, and manganese naphthenate in combination with a member of the class consisting of benzoyl peroxide, sulfuryl chloride, methyl ethyl ketone peroxide, and cumene hydroperoxide.

2. An adhesive composition capable of bonding polyethylene surfaces when placed in contact therewith and heating the resultant body at 75° to 85° C. for 24 to 48 hours, thus producing a bond having a shear strength greater than 500 p.s.i., said composition comprising a mixture of (1) 40 to 70% of an oil selected from the group consisting of unsaturated natural drying oils having an iodine value above 100, linoleic acid, and unsaturated synthetic drying oils wherein the polyhydric alcohol component of an unsaturated natural drying oil having an iodine value above 100 is replaced by a different polyhydric alcohol having more than two carbon atoms, said different polyhydric alcohol component being combined with a fatty acid component of said unsaturated natural drying oil, (2) 10 to 20% tackifying agent selected from the group consisting of chlorinated paraffins, chlorinated rubbers, polymers of 2-chlorobutadiene-1,3, and mixtures of chlorinated polyphenyls, (3) 10 to 35% of hydrocarbon soluble monomer capable of copolymerization with said drying oil, said monomer being of the class consisting of styrene, methyl styrene, and methacrylic acid, and (4) 2 to 6% of catalytic material comprising a member of the class consisting of cobalt naphthenate, iron naphthenate, and manganese naphthenate in combination with a member of the class consisting of benzoyl peroxide, sulfuryl chloride, methyl ethyl ketone peroxide and cumene hydroperoxide.

References Cited in the file of this patent

UNITED STATES PATENTS

| | | |
|---|---|---|
| 1,281,650 | Picard | Oct. 15, 1918 |
| 1,400,041 | Ellis | Dec. 13, 1921 |
| 1,956,965 | Strickhouser | May 1, 1934 |
| 1,957,786 | Koch | May 8, 1934 |
| 2,066,759 | Bent | Jan. 5, 1937 |
| 2,338,230 | Caplan et al. | Jan. 4, 1944 |
| 2,556,336 | Nye | June 12, 1951 |
| 2,664,378 | Heller | Dec. 29, 1953 |
| 2,667,436 | Goepfert et al. | Jan. 26, 1954 |
| 2,806,008 | McNulty et al. | Sept. 10, 1957 |
| 2,819,302 | Koenecke et al. | Jan. 7, 1958 |
| 2,828,237 | Rosser | Mar. 5, 1958 |
| 2,895,866 | Anion | July 21, 1959 |
| 2,928,796 | Heckles | Mar. 15, 1960 |
| 2,936,261 | Cole | May 10, 1960 |
| 2,941,968 | McKenna | June 21, 1960 |
| 2,946,774 | Christenson | July 26, 1960 |

OTHER REFERENCES

Hackh's Chemical Dictionary, 3rd ed., June 22, 1944; p. 288.